United States Patent [19]

Hattori et al.

[11] Patent Number: 4,618,762
[45] Date of Patent: Oct. 21, 1986

[54] IN-FOCUS POSITION DETECTING APPARATUS

[75] Inventors: Jun Hattori; Sadahiko Tsuji, both of Yokohama, Japan

[73] Assignee: Canon Kabushiki Kaisha, Tokyo, Japan

[21] Appl. No.: 563,584

[22] Filed: Dec. 20, 1983

[30] Foreign Application Priority Data

Dec. 27, 1982 [JP] Japan .................................. 57-231428

[51] Int. Cl.[4] ................................................. G01J 1/20
[52] U.S. Cl. ...................................... 250/201; 354/403
[58] Field of Search ................ 250/201, 204; 354/403; 356/1, 4

[56] References Cited

U.S. PATENT DOCUMENTS

| | | | |
|---|---|---|---|
| 3,836,919 | 9/1974 | Matsumoto et al. | 354/403 |
| 4,150,888 | 4/1979 | Filipovich | 354/403 |
| 4,313,654 | 2/1982 | Matsui et al. | 354/403 |
| 4,394,077 | 7/1983 | Yoshino et al. | 354/403 |
| 4,460,259 | 7/1984 | Greivenkamp | 354/403 |
| 4,483,613 | 11/1984 | Yokota | 354/403 |

*Primary Examiner*—David C. Nelms
*Attorney, Agent, or Firm*—Fitzpatrick, Cella, Harper & Scinto

[57] ABSTRACT

An in-focus position detecting optical system comprises a focus lens for imaging the image of an object to be photographed at an imaging position. The focus lens has integrally formed therewith a light projecting lens for projecting a distance measuring light flux onto the object to be photographed. The light projecting lens has the same focal length as that of the focus lens.

5 Claims, 7 Drawing Figures (a)

(b)

(c)

IN-FOCUS POSITION DETECTING APPARATUS

BACKGROUND OF THE INVENTION

1. Field of the Invention

This invention relates to an in-focus position detecting apparatus incorporated in an optical instrument such as a still camera or a video camera, and in particular to a so-called active-type in-focus position detecting apparatus in which light is projected from the apparatus side toward an object to be photographed and the then reflected light from the object to be photographed is photoelectrically detected to thereby detect the in-focus state with respect to the object to be photographed.

2. Description of the Prior Art

A TTL active-type in-focus position detecting apparatus has already been proposed by Japanese Laid-open Patent Application No. 155832/1979.

FIG. 1 of the accompanying drawings shows the optical arrangement and principle of such a TTL active-type in-focus position detecting apparatus. In FIG. 1, reference numeral 1 designates a focusing lens, reference numeral 2 denotes the optic axis of the focusing lens, reference numeral 3 designates the predetermined imaging plane of the focusing lens, reference numeral 4 denotes a light emitting element such as a semiconductor laser (LD) or an infrared light emitting diode (IRED), and reference numeral 7 designates a light receiving element such as a charge coupled device (CCD) or a silicon photodiode (SPC). The light emitting element 4 and the light receiving element 7 are disposed at positions equivalent to the center of the optic axis of the predetermined imaging plane 3. A light flux 5 emitted from the light emitting element 4, reflected by a mirror 4' and transmitted through the off-axis light projecting aperture of the focusing lens 1 is projected onto the surface 8 of an object to be photographed. The light flux 6 reflected by the surface of the object to be photographed is transmitted through the off-axis light receiving aperture of the focusing lens 1, is reflected by a mirror 7' and enters the light receiving element 7.

In FIG. 1, (a) shows the near focus state, (b) shows the in-focus state, and (c) shows the far focus state. In the in-focus state of (b), the spot of the emitted light flux 5 is sharply imaged at the center of the optic axis on the surface 8 of the object to be photographed, and the spot of the reflected light flux 6 also is sharply imaged at the center of the optic axis on the light receiving element 7. In contrast, in the states of (a) and (c), the spots of the light fluxes deviate from each other while blurring in opposite directions on the surface 8 of the object to be photographed and on the surface of the light receiving element 7. Thus, if the direction of displacement of the center of gravity of the signal light flux on the surface of the light receiving element is discriminated, detection of the direction and in-focus of the photo-taking lens can be accomplished.

In such a construction, the accuracy of distance measurement depends on the interval between the aperture of the emitted light flux 5 and the aperture of the reflected light flux 6, and the limit of the measurable distance depends on the areas of said two apertures. That is, to enhance the automatic focus detecting performance, the interval between and the areas of the two apertures need be made great, and this provides the factor for making the diameter of the focusing lens 1 great. That is, this system has a merit that it requires no interlocking mechanism between the photo-taking lens system and the in-focus detecting system and no parallax occurs between the photo-taking lens system and the in-focus detecting system, while the in-focus detecting system is contained in the photo-taking lens and the automatic focus detecting light flux is projected and received through the focusing lens portion and this unavoidably leads to the bulkiness of the entire system, particularly the bulkiness of the focusing lens portion which results from the necessity of causing a light flux larger than the photo-taking light flux to be transmitted. Further, in the aforementioned Japanese Laid-open Patent Application No. 155832/1979, there is a possibility that ghost which may cause malfunctioning in detecting the in-focus state may occur. That is, it is conceivable that the emitted light flux is scattered by the lens surface of the focusing lens portion and the scattered light may enter the light receiving element to cause malfunctioning.

SUMMARY OF THE INVENTION

The present invention has been made in view of the above-noted points and an object thereof is to provide a novel active-type in-focus position detecting apparatus which, like the above-described conventional TTL active-type in-focus position detecting apparatus, has a merit that it requires no interlocking mechanism between the photo-taking lens system and the in-focus detecting system and no parallex occurs between the photo-taking lens system and the in-focus detecting system and which can avoid the bulkiness of the photo-taking lens system, particularly of the focusing lens portion, which has been a disadvantage of the TTL in-focus position detecting apparatus.

Another object of the present invention is to provide an active-type in-focus position detecting apparatus which is free of the malfunctioning which results from occurrence of ghost in the detection of the in-focus state.

The in-focus position detecting apparatus of the present invention is an active-type in-focus position detecting apparatus in which the light flux for projection from light projecting means is projected toward an object to be photographed and the reflected light flux from the object to be photographed is received by light receiving means and the in-focus position is detected on the bases of the then output of the light receiving means, characterized in that an optical member which is discrete from a focusing optical member having the focusing function and which has the same optic axis as that of the focusing optical member and has a focal length equal to that of the focusing optical member is provided as an in-focus position detecting optical system through which at least one of the light flux for projection and the reflected light flux passes.

The invention will become more fully apparent from the following detailed description thereof taken in conjunction with the accompanying drawings.

DESCRIPTION OF THE PREFERRED EMBODIMENTS

Figure 1:
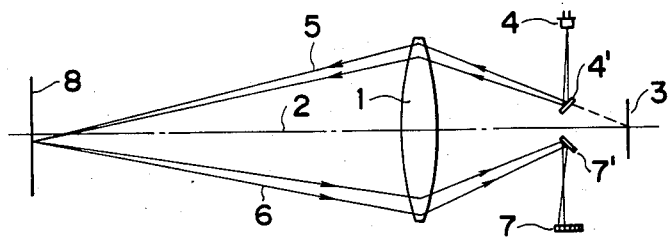
FIGS. 1(a), 1(b) and 1(c) show the basic construction of the optical system of the TTL in-focus position detecting apparatus according to the prior art.
Figure 1:
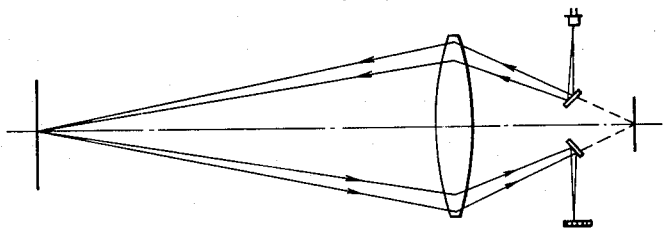
Figure 1:
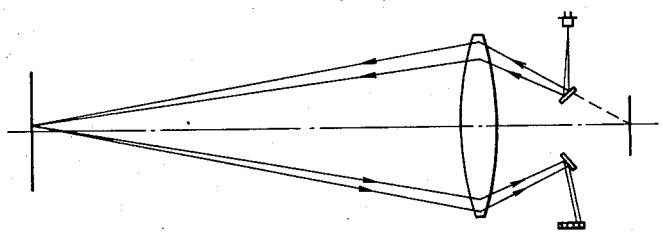

Some embodiments of the present invention will hereinafter be described by reference to drawings, in which portions corresponding to those of FIG. 1 are given similar reference numerals.

Figure 2:
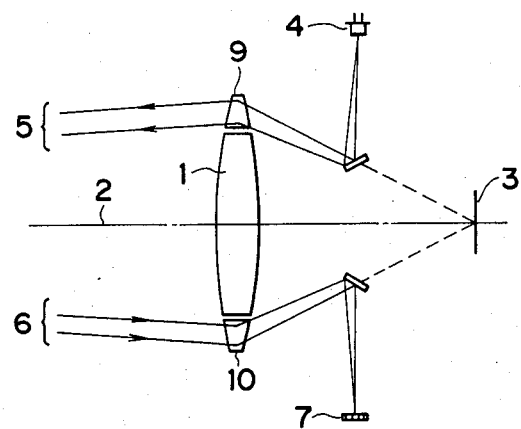
FIG. 2 shows an example of the construction of the optical system of the in-focus position detecting apparatus of the present invention.

Referring fo FIG. 2 which shows an example of the optical basic construction of the in-focus position detecting apparatus of the present invention, reference numerals 9 and 10 designate a light projecting lens and a light receiving lens, respectively, provided separately from a focusing lens 1 near the edges thereof. These two lenses 9 and 10 have the same optic axis as the optic axis 2 and have a focal length equal to that of the focusing lens 1. The predetermined imaging planes of the lenses 9 and 10 are coincident with the predetermined imaging plane 3 of the focusing lens 1, and the lenses 9 and 10 are arranged so as to be movable along the optic axis 2 with the focusing lens 1. In such a construction, just the same automatic focusing operation as that of the construction shown in FIG. 1 is effected, but by providing the light projecting lens 9 and the light receiving lens 10 separately from the focusing lens 1, it is possible to secure a great interval between a light projecting aperture and a light receiving aperture and secure large areas for these two apertures without making the diameter of the focusing lens 1 greater than that of the effective photo-taking light flux. If the diameter of the focusing lens is made small, the weight of the focusing portion adapted to be moved along the optic axis during focusing will become light, and this is very advantageous in making the driving system light in weight and compact and reducing the power consumption. Also, light projection and light reception are effected by separate optical systems and therefore, there is no possibility that ghost light enters a light receiving element 7 to cause malfunctioning.

Figure 3:
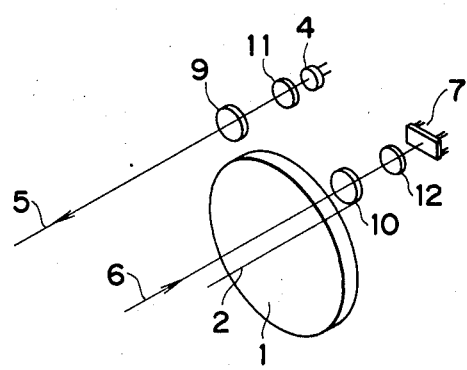
FIGS. 3, 4 and 5 are schematic perspective views of optical system showing different embodiments of the present invention.

FIG. 3 is a schematic perspective view showing an embodiment of the present invention. Reference numerals 9 and 10 designate the above-described light projecting lens and light receiving lens, reference numeral 11 denotes an auxiliary light projecting lens, and reference numeral 12 designates an auxiliary light receiving lens. A light flux 5 emitted from a light emitting element 4 such as LD passes through the auxiliary light projecting lens 11 and the light projecting lens 9 in succession and then is projected onto the surface of an object to be photographed, and of the light flux reflected by the surface of the object to be photographed, the light flux 6 passed through the light receiving lens 10 enters the light receiving element 7 such as CCD or SPC through the auxiliary light receiving lens 12. By the then output of the light receiving element 7, the in-focus state of the focusing lens 1 with respect to the object to be photographed can be detected.

Figure 4:
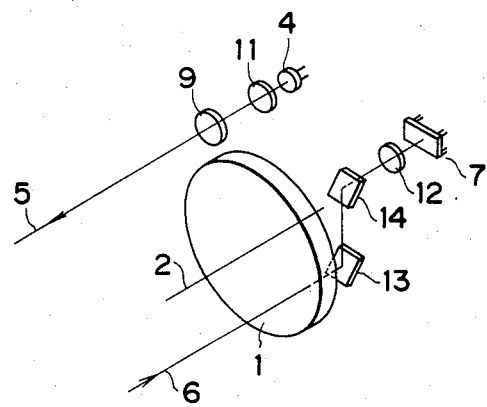

Referring now to FIG. 4 which shows another embodiment of the present invention, reference numerals 13 and 14 designate total reflection mirrors. The present embodiment is an example designed such that the reflected light flux 6 from the object to be photographed is received through a predetermined aperture of the focusing lens 1. The reflected light flux 6 from the object to be photographed passes through the predetermined aperture of the focusing lens 1 and then is reflected by the total reflection mirrors 13 and 14, and passes through the auxiliary light receiving lens 12 to the light receiving element 7.

Figure 5:
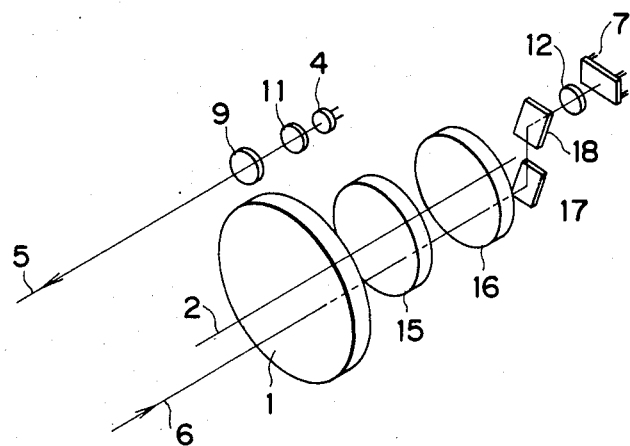

Referring now to FIG. 5 which shows still another embodiment of the present invention, reference numeral 15 designates a variator disposed on the optic axis 2, reference numeral 16 denotes a compensator, reference numeral 17 designates a mirror for selectively reflecting only the reflected light flux 6 of a wavelength belonging to the infrared wavelength range of the projected light flux 5 and transmitting therethrough a light of visible wavelength range, and reference numeral 18 denotes a total reflection mirror. If the mirror 17 for selectively reflecting only the wavelength range of the projected light flux as previously described is used to direct the reflected light flux to the light receiving element 7, the reflected light flux 6 can be led out without reducing the quantity of light of the photo-taking light flux. The present embodiment is an example in which the present invention is applied to a photo-taking lens forming a zoom lens system so that the reflected light flux 6 from the object to be photographed is received by the light receiving element 7 after being transmitted through the focusing lens 1, the variator 15 and the compensator 16 in succession. The light receiving element 7 is disposed at a position conjugate with the predetermined imaging plane of the zoom portion comprising the focusing lens 1, the variator 15 and the compensator 16.

Even in a case where only the light projecting optical system is provided separately from the photo-taking lens as in the second or third embodiment, it is possible to make the diameter of the focusing lens small and secure a sufficiently great interval between the light projecting aperture and the light receiving aperture as compared with the prior art example described previously.

According to the present invention, as described above, an in-focus position detecting optical member for projecting light onto the object to be photographed or receiving the reflection therefore which has the same optic axis and the same focal length as the lens portion having the focusing function is provided separately, whereby there can be realized an active-type focusing position detecting apparatus which has a merit peculiar to the conventional TTL active-type automatic in-focus position detecting apparatus and in which the diameter of the forward lens component of the photo-taking lens is small and the entire system is compact and which is free of the malfunctioning resulting from ghost.

What we claim is:

1. An in-focus position detecting optical system comprising:
    a focus lens for imaging the image of an object to be photographed at an imaging position, and
    a light projecting lens for projecting a distance measuring light from a light source onto said object, a predetermined imaging plane of said light projecting lens being identical to that of said focus lens, and said light projection lens being arranged to move with said focus lens along an optical axis of said focus lens.

2. An in-focus position detecting optical system according to claim 1, wherein said focus lens has a light receiving lens for directing light reflected from said object to a light receiving element, a predetermined imaging plane of said light receiver lens being identical to that of said focus lens, and said light receiving lens being arranged to move with said focus lens along an optical of said focus lens.

3. An in-focus position detecting apparatus comprising:
  (a) light emitting means for emitting distance measuring light;
  (b) a focus lens for imaging the image of an object to be photographed at an imaging position;
  (c) a light projecting lens for projecting a distance measuring light from said light emitting means onto said object, a predetermined imaging plane of said light projecting lens being identical to that of said focus lens, and said light projecting lens being arranged to move with said focus lens along an optical axis of said focus lens;
  (d) light receiving means for receiving light reflected from said object; and
  (e) a light receiving lens for directing the reflected light from said object to said light receiving means, a predetermined imaging plane of said light receiving lens being identical to that of said focus lens, and said light receiving lens being arranged to move with said focus lens along the optical axis of said focus lens.

4. An in-focus position detecting optical system comprising:
  (a) a focus lens for imaging the image of an object to be photographed at an imaging position;
  (b) light emitting means for emitting light;
  (c) a light projecting lens for projecting light emitted from said light emitting means onto said object, a predetermined imaging plane of said light projecting lens being identical to that of said focus lens, and said light projection lens being arranged to move with said focus lens along an optical axis of said focus lens; and
  (d) light receiving means for receiving light through a predetermined aperture of said focus lens.

5. An in-focus position detecting optical system comprising:
  (a) a focus lens for imaging the image of an object to be photographed at an imaging position;
  (b) a variator lens for effecting a magnification changing action;
  (c) a compensator lens;
  (d) light emitting means;
  (e) a light projecting lens for projecting the light emitted from said light emitting means onto said object, a predetermined imaging plane of said light projecting lens being identical to that of said focus lens, and said light projecting lens being arranged to move with said focus lens along an optical axis of said focus lens; and
  (f) light receiving means for receiving light though a predetermined aperture in each of said focus lens, said variator lens and said compensator lens.

* * * * *

UNITED STATES PATENT AND TRADEMARK OFFICE
CERTIFICATE OF CORRECTION

PATENT NO. : 4,618,762

DATED : Oct. 21, 1986

INVENTOR(S) : JUN HATTORI, ET AL.

It is certified that error appears in the above-identified patent and that said Letters Patent is hereby corrected as shown below:

COLUMN 2

Line 48, "bases" should read --basis--.

COLUMN 3

Line 2, "system" should read --systems--.
Line 11, "fo" should read --to--.

COLUMN 5

Line 2, "optical" should read --optical axis--.

Signed and Sealed this

Twenty-fourth Day of March, 1987

*Attest:*

DONALD J. QUIGG

*Attesting Officer*   *Commissioner of Patents and Trademarks*